United States Patent
Bonsignore et al.

(10) Patent No.: US 6,432,320 B1
(45) Date of Patent: Aug. 13, 2002

(54) REFRIGERANT AND HEAT TRANSFER FLUID ADDITIVE

(76) Inventors: Patrick Bonsignore, 23865 W. Sussex Dr., Channahon, IL (US) 60410;
Michael H. Gurin, 4132 Cove La. Unit A, Glenview, IL (US) 60025

( * ) Notice: Subject to any disclaimer, the term of this patent is extended or adjusted under 35 U.S.C. 154(b) by 0 days.

(21) Appl. No.: 09/721,074

(22) Filed: Nov. 22, 2000

Related U.S. Application Data

(63) Continuation-in-part of application No. 09/184,137, filed on Nov. 2, 1998, now abandoned.

(51) Int. Cl.[7] .............................. C09K 5/14; C09K 5/00
(52) U.S. Cl. .............................. 252/70; 252/71; 165/10; 165/104.15; 165/104.19
(58) Field of Search ....................... 252/70, 71; 165/10, 165/104.15, 104.19

(56) References Cited

U.S. PATENT DOCUMENTS

| | | | |
|---|---|---|---|
| 5,641,424 A | 6/1997 | Ziolo et al. .................... | 252/67 |
| 5,863,463 A | 1/1999 | Reichgott et al. ............ | 252/390 |
| 6,043,199 A | 3/2000 | Godici ........................ | 508/285 |
| 6,059,996 A | 5/2000 | Minks et al. ................ | 252/395 |
| 6,103,144 A | 8/2000 | Cheng ......................... | 252/394 |

FOREIGN PATENT DOCUMENTS

JP    59-165691    *  9/1984

* cited by examiner

*Primary Examiner*—Anthony Green
(74) *Attorney, Agent, or Firm*—Fay, Sharpe, Fagan, Minnich & McKee, LLP

(57) ABSTRACT

An additive suited to use in combination with heat transfer media comprises a chemically stabilized nano-particle size powder. Suitable powders include those of copper, beryllium, titanium, nickel, iron, alloys or blends thereof, and carbon. The surface of the powder is modified by surface complexation or physical adsorption with a chemical agent. The additive, when mixed with a heat transfer medium, forms a colloidal dispersion which exhibits enhanced heat transfer capacity and thermal conductivity, stable chemical composition, faster heat transfer rates, dispersion maintenance which are beneficial to most heat transfer systems.

27 Claims, No Drawings

REFRIGERANT AND HEAT TRANSFER FLUID ADDITIVE

This application is a Continuation-in-Part of U.S. application Ser. No. 09/184,137, filed Nov. 2, 1998, now abandoned.

BACKGROUND OF THE INVENTION

1. Field of the Invention

The present invention relates to additives for heat transfer media and refrigerants, and in particular to the use of stabilized nano-particle size metal powders to enhance the thermal capacity and thermal conductivity of refrigerant and heat transfer media.

2. Description of the Prior Art

Heat transfer media have applications in both heating and cooling, including refrigeration, air conditioning, computer processors, thermal storage systems, heating pipes, fuel cells, and hot water and steam systems. Heat transfer media include a wide range of liquid or phase change materials, including water, aqueous brines, alcohols, glycols, ammonia, hydrocarbons, ethers, and various halogen derivatives of these materials, such as chlorofluorocarbons (CFCs), hydrochlorofluorocarbons (HCFCs), and the like. These have been used alone or in combination with additives, such as refrigerant oil additives for lubrication and composites of fluids to affect boiling or freezing temperature. Such media are used to transfer heat from one body to another, typically from a heat source (e.g., an vehicle engine, boiler, computer chip, or refrigerator), to a heat sink, to effect cooling of the heat source, heating of the heat sink, or to remove unwanted heat generated by the heat source. The heat transfer medium provides a thermal path between the heat source and the heat sink, and may be circulated through a loop system or other flow system to improve heat flow.

Several criteria have been used for selecting heat transfer media for specific applications. Exemplary criteria include the influence of temperature on heat transfer capacity and viscosity, and the energy required to pump the medium through a heat transfer system. Specific parameters describing the comparative performance of a heat transfer medium are density, thermal conductivity, specific heat, and kinematic viscosity. The maximization of the heat transfer capability of any heat transfer system is important to the overall energy efficiency, material resource minimization, and system costs. There are numerous improvements in heat transfer systems that are further enhanced by increased thermal capacity. One example is the utilization of secondary loop or multiple stage refrigeration systems. A secondary loop refrigeration system is more compact in design, has a reduced charge of refrigerant, requires a reduced system horsepower, and has lower implementation costs.

Other factors that affect the feasibility and performance of heat transfer media include environmental impact, toxicity, flammability, physical state at normal operating temperature, and corrosive nature.

A variety of liquids can be use d as heat transfer media in systems where heat transfer efficiency is to be maximized and fluid transport energy minimized. Such media can benefit from enhanced thermal conductivity. The heat transfer media may include a filler material that is thermally conductive to enhance the thermal conductivity of the heat transfer medium. Nanoparticle size copper oxide has been used in a water heat transfer fluid in a secondary loop. However, high surface area metal powders in an aqueous environment tend to experience corrosion, even so-called inert metals.

The present invention provides a new and improved additive for heat transfer media and method of use.

SUMMARY OF THE INVENTION

In accordance with one aspect of the present invention, a heat transfer composition is provided. The composition includes a heat transfer medium, and an additive comprising a powder, the powder having a corrosion inhibitive coating or dispersion enhancing coating thereon.

In accordance with another aspect of the present invention, an additive for a heat transfer medium is provided. The additive includes a nano-particle size powder formed from one of the group consisting of a metal, an alloy, a metal compound, and carbon, the powder being chemically stabilized with an azole.

In accordance with another aspect of the present invention, a process for transferring heat between a heat source and a heat sink is provided. The process includes transferring heat between the heat source and the heat sink with a heat transfer composition which includes a powder. The powder has a surface thereof coated with a chemical agent which provides the powder with improved corrosion resistance or dispersion characteristics as compared with an uncoated powder.

As used herein, the term heat transfer is used to imply the transfer of heat from a heat source to a heat sink, and applies to both heating and cooling (e.g., refrigeration) systems.

The term "primary loop" refers to the heat transfer method used in a primary refrigeration system, boiler system, or any other system that is directly affected by an energy transfer mechanism. This includes a compressor in a refrigeration system, combustion source in a boiler system, or a heat transfer fluid in an absorption system.

The term "secondary loop" refers to the path over which a heat transfer medium travels while it is being cycled between a heat source and a primary system, boiler system, or any other system that is indirectly affected by an energy transfer mechanism. This includes a shell and tube or plate heat exchanger in a refrigeration system or in a boiler system. The loop refers to the path over which the heat transfer medium travels while it is being cycled between the heat source and the primary system. Thus, for example, a secondary loop refrigeration system uses a heat transfer medium to transport energy from a heat source to a primary refrigeration system.

The term "heat transfer fluid," or "heat transfer medium," as used herein, includes liquids, viscous materials, vapor and gaseous heat transfer materials which flow at the operating temperature of a heat transfer system, and includes materials which may be solid at room temperature, but that are flowable at the operating temperature of the system.

The term "nano-sized particle," or similar terms, as used herein, includes particles which have an average size of up to 2000 nm.

One advantage of the present invention is that the thermal conductivity, thermal capacity, and energy efficiency of a host heat transfer medium are increased.

Another advantage of the present invention is that pump energy requirements may be reduced.

Yet another advantage of the present invention is that the additive is readily dispersed in the heat transfer medium.

A further advantage of the present invention derives from stabilization and passivation of the additive, enabling direct immersion into corrosive environments.

A yet further advantage of the invention is that the additive may maintain a mobile colloidal dispersion within the heat transfer fluid, enabling the additive to be utilized without the use of dispersion enhancement devices in a host heat transfer system.

A still further advantage of the present invention is that effects on the boiling and freezing temperatures of the host heat transfer fluid are minimized.

Other advantages of the present invention derive from the enhanced thermal capacity of the heat transfer composition, which results in energy consumption reductions by reducing the incoming fluid temperature (in a cooling system) needed to achieve a targeted fluid leaving temperature. Reductions in fluid velocities may also be achieved, thereby reducing friction losses and pressure losses within a circulation pump.

A further advantage of the present invention is that by enabling stabilizing pure metals or their alloys to be used in a heat transfer system, heat transfer compositions with higher thermal transfer properties may be achieved as compared with compositions using oxidized forms of the metals or alloys.

Yet another advantage of the present invention is that the heat transfer additive is compatible with a wide range of heat transfer media, including, but not limited to media for applications ranging from engine cooling, heating, air conditioning, refrigeration, thermal storage, and in heat pipes, fuel cells, battery systems, hot water and steam systems, and microprocessor cooling systems.

Additional features and advantages of the present invention are described in and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

DETAILED DESCRIPTION OF THE PRESENTLY PREFERRED EMBODIMENTS

An additive is provided for use in thermal transfer media which enhances the thermal capacity of the heat transfer media. A thermal transfer medium in combination with the additive, forms a composition which, when used in a heat transfer system, has a number of advantages, including increased thermal capacity increased heat transfer rate, while minimizing pump energy requirements and providing long and stable additive performance.

The heat transfer additive is a material that improves the thermal transfer properties of the fluid and preferably comprises a powder which is thermally conductive. The powder may be a finely ground or otherwise comminuted solid or a crystalline solid. For example, ball milling or other suitable process may be used to form a fine powder.

The preferred particle size is influenced by a number of factors, including cost effectiveness, dispersion and settling characteristics (smaller particles tend to settle more slowly and re-disperse more quickly). Preferred powders have an average particle size (expressed in terms of the number average value of the largest dimension perpendicular to the longest dimension of the particle) of from about 1 nanometer and 100 microns. More preferred powders have a particle size of from about 10 nanometers to about 2000 nm. Particularly preferred powders have a particle size of from about 25 nanometers to about 1000 nm. Above about 1000 nm, the particles tend to maintain a dispersion for shorter time than may be desirable for some applications. Within the preferred range, some of the particles may form aggregates or clusters having an average width of from about 50 nm to 1000 nm.

Preferred materials for forming the powder have a high heat transfer coefficient and high thermal conductivity per unit weight of the material. The powder may be a powdered metal, powdered alloy, powdered compound of a metal, powdered carbon, powdered carbon compound, or a combination thereof. Exemplary metal-based powders include, for example, those of copper, aluminum, titanium, nickel, beryllium, silver, gold, or iron, alloys or blends, or compounds thereof. Copper and beryllium are particularly preferred metals for forming the powder, copper metal being particularly preferred. Exemplary carbon-based powders include those of graphite, carbon nanotubes, diamond, fullerene carbons of the general formula $C_{2n}$, where n is an integer of at least 30, or blends thereof.

The powder is chemically or physically altered by association with a chemical agent, for example, by surface complexation or physical adsorption of a chemical agent on the surface of the powder particles. The chemical agent is preferably one which stabilizes and/or passivates the powder, providing corrosion resistance. This provides stabilization and passivation of the additive over a wide temperature range and in a wide variety of potentially corrosive environments. Improved redispersion, increased settling time, reduced clumping, and long term stability of the host powder, may also result from the presence of the chemical agent, as compared with a similar powder without the chemical agent. While the exact cause of some of these improvements is not fully understood, it is speculated that the chemical agent controls hydrophobic, hydrophilic, and molecular polarity properties of the powder, thus affecting settling time and redispersion time. The chemical agent also allows the use of pure, or relatively pure metals which are usually prone to corrosion, rather than their oxides. Thus, copper metal powder may be used in place of copper oxide, resulting in enhanced thermal conductivity.

The chemical agent preferably acts as a coating for the particles, residing primarily on the surface of the particles. It will be appreciated that the coating comprising the chemical agent of the present invention is not merely an oxidized layer of the metal powder, such as a layer of copper oxide on a copper powder formed by oxidation of the copper surface.

For the chemical agent, corrosion inhibitors and/or metal film coatings may be used. Exemplary chemical agents include azoles and their substituted derivatives, particularly aromatic azoles (including diazoles, triazoles, and tetrazoles), such as benzotriazole, tolyltriazole, 2,5-(aminopentyl)benzimidazole, alkoxybenzotriazole, imidazoles, such as oleyl imidazoline, thiazoles, such as mercaptobenzothiazole, 1-phenyl-5-mercaptotetrazole, thiodiazoles, halogen-resistant azoles, and combinations thereof. Examples of halogen-resistant azoles include 5,6-dimethyl-benzotriazole; 5,6-diphenylbenzotriazole; 5-benzoyl-benzotriazole; 5-benzyl-benzotriazole and 5-phenyl-benzotriazole. Alkyl-substituted aromatic trazoles, such as tolyltriazole are particularly preferred. Azoles are particularly useful with copper-containing powders, such as pure copper or copper alloys, e.g. brass, but also have application with other metal-based powders, such as those formed from aluminum, steel, silver, and their alloys.

Other suitable chemical agents include inorganic corrosion inhibitors, including, but not limited to water-soluble amine salts, phosphates, and salts of transition elements, such as chromate salts. These chemical agents may also be used in combination with other corrosion inhibitors, such as azoles, to provide a "self heal" function. Lignin-based chemical agents may also be used, in particular with carbon-based powders.

Ethylene oxide/propylene oxide (EO/PO) block copolymers may also be used as chemical agents. Surfactants, such as anionic and nonionic surfactants, may also be used as chemical agents, particularly for carbon. Exemplary anionic surfactants include calcium salts of alkylbenzenesulfonates. Exemplary nonionic surfactants include polyoxyalkylene alkyl ethers and polyoxyethylene/polyoxypropylene polymers.

Tolyltriazole is a particularly effective chemical agent for copper. One preferred additive includes copper powder to which tolyltriazole is applied at from about 1–5% by weight. For aluminum and its alloys, cerium-based chemical agents may be used. For example, an aqueous cerium non-halide solution is first applied to the powder, followed by contacting the treated surface with an aqueous cerium halide solution. For copper and silver particles, in particular, thiodiazoles substituted on the ring by a mercapto group and/or an amino group and triazoles substituted by a mercapto group and/or an amino group are effective. These compounds form a film on the particles. Oleyl imidazoline is particularly effective for steel. Ferrous and copper alloys can benefit from chemical agent corrosion inhibitors sold under the tradename TRIM™, available from Master Chemical Corporation of Toledo, Ohio which include triethanolamine and monoethanolamine.

Combinations of two or more azoles may be particularly effective, such as a combination of alkoxybenzotriazole, mercaptobenzothiazole, tolyltriazole, benzotriazole, a substituted benzotriazole, and/or 1-phenyl-5-mercaptotetrazole. Another combination which is particularly effective for metallic surfaces is a mixture of a pentane-soluble imidazoline, a pentane-soluble amide, a pyridine-based compound, a pentane-soluble dispersant, and a solvent.

Other corrosion inhibitors/passivating agents may be used which result in passivation of the powder and/or achieve a desirable effect on dispersion and redispersion.

For carbon-containing powders, such as graphite, nanotubes of carbon, or blends of these carbon derivatives, suitable chemical agents, include lignin and its derivatives. In the paper-making industry, lignin may be recovered as a by-product of the cellulose product. Depending on conditions under which the lignin is precipitated, the precipitated lignin may be either in the form of free acid lignin or a lignin salt. A monovalent salt of lignin, such as an alkali metal salt or an ammonium salt, is soluble in water, whereas free acid lignin and polyvalent metal salts of lignin are insoluble in water. In the case of carbon-based powders, the chemical additive tends to act as a dispersant, rather than as a corrosion inhibitor/passivation agent.

Other chemical agents particularly useful with carbon-based powders include alkali metal salts, alkali earth metal salts, ammonium salts, alkyl ether phosphates, solvents, butyl ether and other surfactants, and the like.

The lignin-based compounds may be used alone or in combination with other chemical agents. Lignin sulfonic acid, alkali metal salts of lignin sulfonic acid, alkaline earth metal salts of lignin sulfonic acid, and ammonium salts of lignin sulfonic acid act as an anionic, surfactant-like component.

Such lignin-based compounds can be present in the chemical agent either individually or in the form of mixtures of two or more compounds. For example, lignin sulfonic acid and/or alkali metal, alkaline earth metal and/or ammonium salts and one or more alkyl ether phosphates are effective chemical agents for carbon-based powders. Storage stable, low viscosity dispersants can also be made by replacing 10–25% of the submicron lignin with either an acrylic resin, a rosin resin, a styrene-maleic anhydride copolymer resin, or a combination thereof. These are effective chemical agents for carbon-based powders, in particular. For example, the chemical agent may include a lignin sulfonic acid and/or an alkali metal, alkaline earth metal, or ammonium salt. Other suitable combinations include a mixture of aminoethylated lignin and a sulfonated lignin.

While not fully understood, it is thought that lignin-based compounds reduce the interfacial tension between the carbon particles and the aqueous phase in order to wet the surface of the carbon particles.

As is apparent, the choice of a preferred chemical agent may depend not only on the material from which the powder is formed, but also on the chemical environment, for example, whether the heat transfer medium is generally hydrophobic or hydrophilic, the desirability of reducing friction losses in the operating system in which the composition is to be used, and the desirability of maintaining a long term dispersion within the heat transfer composition.

For example, in compositions where a high chemical resistance is desired, a neutral or alkaline azole, such as 2,5-(aminopentyl) benzimidazole may be used as the chemical agent. Hydrophobic additives tend to maintain superior dispersions when the heat transfer fluid composition is significantly hydrophobic. Hydrophilic additives tend to maintain superior dispersions when the heat transfer fluid compositions is either water or significantly hydrophilic.

While the exact process by which dispersion is improved and maintained by the chemical agent is not known, it is thought that organic corrosion inhibitors, such as heterocyclics react with the metal powder surface to form an organometallic complex. This takes the form of at least one, preferably several monolayers on the surface of the particle. The corrosion inhibitive action of such chemical agents upon the metal powder is manifest even at molecular layer dimensions, while unexpectedly achieving enhanced dispersion of the additive in the heat transfer medium. While aromatic azoles are believed to bond directly to the metal surface to produce an inhibiting complex, other surface interactions which result in a modification of the surface resulting in improved dispersion and/or passivation are also contemplated.

One or more of such heat transfer additives may be used in combination with a heat transfer medium.

In addition to a chemical agent, a suitable solvent may also be used. Common solvents may be used for this purpose.

The composition may further include a prestabilized filler to further enhance the effectiveness of the surface modification. For example a material that will inhibit oxidation of the particle, for example, a noble metal, such as gold or silver, with or without a fatty acid may be used as a prestabilized filler in combination with powder particles treated with one of the chemical agents described above.

One or more of such fillers may be used in combination with a heat transfer medium.

The treated powder formed by treating the powder with a chemical agent as described above may include an optional further functionalization agent, such as a treatment with polytetrafluoroethylene (PTFE, sold under the trade name Teflon by E. I. Du Pont de Nemours and Co., Wilmington, Del.). Such funtionalization may be carried out by solvent polymerization of copolymers containing monomer units useful as coating additives. The tolyltriazole, or other azole used as the chemical agent, may be functionalized prior to mixing with the powder. Such PTFE-functionalized azoles are commercially available.

Such functionalization agents tend to reduce the coefficient of friction associated with the treated powder. Less polar fluids, such as alcohols and alkylglycols, which add hydrophobic characteristics that enhance the additive's dispersion within the fluid may also be used as functionalization agents. Functionalization agents may also be used to accelerate the re-dispersion time of the additive in the heat transfer composition. Fuctionalization agents which provide surface modification or functional group substitution may also be used. Other benefits of certain functionalization agents include a reduction or elimination of mechanical dispersal mechanisms and lower pressure drops that enable reduced pumping energy and smaller pump horsepower. The functionalized treated powder may enable the reduction of refrigerant oils to enhance further the efficiency of a heat exchanger.

Other functionalization agents may be used to increase control of hydrophobic, hydrophilic, and molecular polarity qualities associated with treated metal powders.

The heat transfer composition may further comprise other additives, such as surfactants to reduce further the interfacial tension between the components. The interface between components typically contains voids and airspace that detracts from higher heat transfer coefficients. For example, co-corrosion inhibitors selected from the group of aromatic acids and naphthenic acids, which acids have the free acid form or the alkaline, alkaline earth, ammonium and/or amine salt form may be used. Sodium benzoate, however, is generally not suitable.

The composition may further include anti-oxidants to improve the long-term stability of the composition, while maintaining the superior thermal characteristics of metals as compared to their metal oxide counterparts. The composition may further include other additives, such as traditional dispersants to maintain superior dispersions within the heat transfer fluid. For example, a low molecular weight dispersant may be applied as a coating to the powder and having a polar group with an affinity for the heat transfer media. Hydrophobic dispersants will maintain superior dispersions when the heat transfer media is significantly hydrophobic. Hydrophilic dispersants will maintain superior dispersions when the heat transfer media is either water or significantly hydrophilic. The composition may further include materials which reduce the surface friction between the metal additives and any surfaces in the heat exchanger or pump surfaces. Abrasion prevention agents, antifoaming agents, and lubricating oils may also be used to enhance the overall performance of heat transfer compositions, such as refrigerants in achieving optimal heat transfer.

The stabilized nano-particle to micron-particle size powder provides increased operational energy efficiencies to the thermal transfer fluid through its enhanced thermal capacity. The additive also reduces the need for dispersal mechanisms in the heat transfer system. The additive exhibits slow settling and soft settling characteristics and maintains a colloidal dispersion, as compared with conventional additives. This enables heat transfer systems to operate with higher energy efficiencies through simple addition of the additive to an existing heat transfer medium.

The heat transfer medium preferably has a high heat transfer capacity, high thermal loading capacity, and long-term thermal and chemical stability throughout the range over which the composition is to be operated. Suitable heat transfer media include fluids, such as liquids, gases, pressurized gases (i.e., fluids which are gaseous under atmospheric pressure but are liquid or semi-liquid under the operating conditions used), viscous fluids, and phase change materials. Phase change materials are those which change from one phase, such as a solid, to a flowable material, such as a liquid or viscous fluid, at the operating temperature of the composition. The additive may be used in combination with a variety of heat transfer media, suitable media including water and other aqueous systems, such as, for example, aqueous brines (e.g., sodium or potassium chloride solution, sodium or potassium bromide solution, and the like), and mixtures of water with alcohols, glycols, ammonia, and the like. The additive may also be used in organic-based systems, suitable media for these applications including materials such as hydrocarbons, mineral oils, natural and synthetic oils, fats, waxes, ethers, esters, glycols, and various halogen derivatives of these materials, such as CFCs, hydrochlorofluorocarbons (HCFCs), and the like. These heat transfer media may be used alone or in combination. Mixed organic and aqueous heat transfer media may also be used, such as a mixture of water and ethylene glycol. One preferred mixed heat transfer media includes ethylene glycol and water in a volume ratio of from about 5:1 to about 1:5.

In secondary loop systems, preferred heat transfer media include glycols, such as ethylene glycol, water, poly-α-olefins, silicate esters, chlorofluoro carbon liquids sold under the tradename Fluorinert, such as FC-70, manufactured by the 3M Company. Polyaromatic compounds may also be used, such as biphenyl, diphenyl oxide, 1,1 diphenyl ethane, hydrogenated terphenylquatraphenyl compounds, and mixtures thereof, and dibenzyl toluene. Eutectic mixtures of two or more compounds may also be used, such as a eutectic mixture sold under the tradename Dowtherm A by Dow Chemical Co., which includes 73% diphenyl oxide and 27% biphenyl. Other preferred heat transfer media for secondary loop systems include mineral oils and waxes, such as naphthenic and paraffinic oils and waxes, particularly those specified for high temperature applications, natural fats an oils, such as tallow and castor oils, synthetic oils, such as polyol esters, polyolefin oils, polyether oils, and the like.

For primary loop systems, suitable heat transfer media include water, aqueous solutions, salts, CFCs, HCFCs, perfluorinated hydrofluorocarbons (PFCs), highly fluorinated hydrofluorocarbons (HFCs), hydrofluorocarbon ethers (HFEs), and combinations thereof. Azeotropic mixtures of heat transfer media may be used. Propane and other natural gases are also useful in some applications.

Exemplary primary loop media include salt-hydrates, organic eutectics, clathrate-hydrates, paraffins, hydrocarbons, Fischer-Tropsch hard waxes, and inorganic eutectic mixtures. Examples of these primary loop media include inorganic and organic salts, preferably ammonium and alkali and alkali earth metal salts, such as sulfates, halides, nitrates, hydrides, acetates, acetamides, perborates, phosphates, hydroxides, and carbonates of magnesium, potassium, sodium, and calcium, both hydrated and unhydrated, alone or in combination with these or other media components. Examples of these include potassium sulfate, potassium chloride, sodium sulfate, sodium chloride, sodium metaborate, sodium acetate, disodium hydrogen phosphate dodecahydrate, sodium hydroxide, sodium carbonate decahydrate, hydrated disodium phosphate, ammonium chloride, magnesium chloride, calcium chloride, calcium bromide hexahydrate, perlite embedded with hydrogenated calcium chloride, lithium hydride, and lithium nitrate trihydrate. Other suitable primary loop media include acetamide, methyl fumarate, myristic acid, Glauber's salt, paraffin wax, fatty acids, methyl-esters, methyl palmitate, methyl stearate, mixtures of short-chain acids, capric and lauric acid, commercial coconut fatty acids, propane and methane and the like.

Propylene glycol, mineral oil, other oils, petroleum derivatives, ammonia, and the like may also be used.

The selection of a preferred heat transfer medium is in part dependent on the operating temperature range, heat transfer effectiveness, cost, viscosity within the operating temperature range, and environmental impact if the material is likely to leave the system.

The heat transfer additive is particularly useful in combination with heat transfer media which tend to be corrosive, such as aqueous brines.

The heat transfer additive is combined with the heat transfer medium to form an effective heat transfer composition which comprises a dispersion of the additive in the heat transfer medium. The heat transfer additive may be supplied in powder form for addition to a heat transfer medium or to a heat transfer system in which a heat transfer medium or fluid is already present. Other additives may be added directly to the heat transfer medium, or combined with the heat transfer additive.

Alternatively, the heat transfer additive may be combined as a blend, solution, or other mixture (azeotropic or otherwise) with one or more other materials. Such other materials may include other heat transfer additives and substances used to alter the freezing, melting, and/or boiling temperature of the heat transfer fluid.

In yet another embodiment, the heat transfer additive is supplied in concentrated form, together with one or more of the components of a heat transfer fluid, for later combination with the remaining components. For example, all of the components of a heat transfer fluid, including the heat transfer additive, but with the exception of water or other bulk fluid, are combined and supplied as a concentrate. When needed, the concentrate is mixed or otherwise combined with water, other bulk fluid, or added to an existing system in which the additive and/or other components of the heat transfer fluid have become depleted over time.

For example, the chemical additive may be first combined with a suitable solvent in which the chemical additive is soluble. Heat may be applied, if desired, to effect solubilization. The powder is then added to the mixture and allowed to contact the powder and interact to form the treated powder. Other additives, such as functionalizing agents and surfactants may also be added to the mixture. Excess chemical additive may be removed by filtering the treated powder then washing the treated filtered powder in a suitable solvent, which may be the same solvent used to dissolve the chemical additive, or a different solvent. The washed or unwashed treated powder is then dried, either by air drying or in an oven at a sufficient temperature to remove the solvent without deleteriously affecting the properties of the additive. Alternatively, for example, where the solvent is useful in the heat transfer media, the drying step may be avoided. In another alternative embodiment, the treated powder is filtered to remove the solvent and/or excess chemical additive.

In yet another alternative embodiment, the chemical agent is added to a mixture of the heat transfer medium and the powder. In this embodiment the chemical agent still contacts the powder surface and modifies the surface properties, either by chemically modifying the surface, physical adsorption or some other form of interaction.

The optimal amount of the additive used depends on the particular application, the composition of the additive, and the host heat transfer medium's ability to maintain the additive as a dispersion in the heat transfer composition. The cost to benefit ratio in terms of increased energy efficiency may also be a factor in determining the preferred concentration. The additive may be present in the heat transfer composition at a concentration of from about 1 to 99% by weight, more preferably from about 3–20% by weight, and most preferably, around 10% by weight.

Preferably, the chemical agent is present in a stoichiometric excess. By this, it is meant that the chemical agent is present in sufficient amount to provide at least a monolayer of coverage over the available surface of the particles.

Additives formed according to the present invention preferably maintain a colloidal dispersion, are not prone to gas phase change, and have a high heat transfer capacity with low viscosity over the entire intendedoperating range. Preferred additives are also nonflammable, environmentally friendly, non-toxic, and chemically stable. The additive exhibits compatibility with a wide range of heat transfer media and applications over a wide range of operating conditions. Additives formed according to the present invention exhibit effectiveness within both primary and secondary loop heat transfer media as dispersion and closed loop re-circulation is achieved in non-phase change and phase change processes. The heat transfer media additive may be used in a variety of applications, including engine cooling, air conditioning, refrigeration, thermal storage, heat pipes, fuel cells, and hot water and steam systems.

The heat transfer composition has application in a wide variety of heat transfer applications including, but not limited to heating and cooling, including refrigeration, air conditioning, computer processors, thermal storage systems, heating pipes, fuel cells, and hot water and steam systems. The enhanced thermal capacity heat transfer composition may be utilized in primary and or secondary loop heat transfer systems.

In primary loop systems the heat transfer composition transfers heat between an energy source and a heat transfer medium by transferring energy from the energy source to the heat transfer composition.

In secondary loop systems, the heat transfer composition transfers heat in a secondary loop, between a heat source and a heat sink by transferring heat from the heat source to the heat transfer composition and transferring the heat from the heat transfer medium to the heat sink.

Without intending to limit the scope of the invention, the following example describes a method of forming and using the heat transfer compositions of the present invention.

EXAMPLES

Example 1

A heat transfer composition is formed by using a copper powder comprising copper particles of average particle size of 50 nanometers. The powder was chemically modified with tolyltriazole by the following method. A solution of tolyltriazole (sold under the trade name Cobratec TT 100, by PMC, Inc, of Sun Valley, Calif.) at 3% by weight of the copper powder, was dissolved in a volatile organic solvent comprising 2-butanone (also known as methyl ethyl ketone, MEK) and stirred on a magnetic stirring hot plate. Copper powder sold under the trade name Cu 110 by Atlantic Equipment Engineers (spherical 1–5 microns particle size) was reduced to a powder of an average particle size of 50 nanometers by a ball milling process. The resulting copper powder was slurried in the solution for about 15 minutes at a temperature of 50–55° C.

The coated product was isolated by filtration, washed once with solvent and then allowed to dry either in air or by oven drying. The product showed enhanced thermal transfer properties and dispersion characteristics when combined with heat transfer media as compared with an untreated copper powder.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A heat transfer composition comprising:
   a heat transfer medium; and
   an additive comprising:
      a powder selected from the group consisting of metals, metal oxides, alloys, and combinations thereof, the powder having an average particle size of from about 1 nanometer to about 100 microns, and
      a coating on the powder, the coating including at least one chemical agent selected from the group consisting of organic corrosion inhibitors, inorganic corrosion inhibitors, ethylene oxide/polypropylene oxide block copolymers, and combinations thereof.

2. The heat transfer composition of claim 1, wherein the coating is one which does at least one of the following:
   a) increases settling time of the additive in the heat transfer medium;
   b) passivates the additive;
   c) inhibits corrosion of the additive; and
   d) increases long term stability of the additive.

3. The heat transfer composition of claim 1, wherein the powder comprises particles having an average size of less than 10 microns.

4. The heat transfer composition of claim 3, wherein the powder particles have an average size of from about 10 nanometers to 2000 nanometers.

5. The heat transfer composition of claim 4, wherein the powder particles have an average size of from about 25 nanometers to 1000 nanometers.

6. The heat transfer composition of claim 1, wherein the powder is formed from at least one material selected from the group consisting of copper, aluminum, titanium, nickel, beryllium, silver, gold, and iron, alloys thereof, blends thereof, and compounds thereof.

7. The heat transfer composition of claim 6, wherein the powder comprises copper or beryllium.

8. The heat transfer composition of claim 1 wherein the coating includes a corrosion inhibitor.

9. The heat transfer composition of claim 8, wherein the corrosion inhibitor is selected from the group consisting of azoles, substituted azole derivatives, and combinations thereof.

10. The heat transfer composition of claim 9, wherein the azole or substituted azole derivative is selected from the group consisting of benzotriazole, tolyltriazole, 2,5-(aminopentyl)benzimidazole, alkoxybenzotriazole, imidazoles, thiazoles, 1-phenyl-5-mercaptotetrazole, thiodiazoles, halogen-resistant azoles, and combinations thereof.

11. The heat transfer composition of claim 10, wherein the substituted azole includes an alkyl-substituted aromatic triazole.

12. The heat transfer composition of claim 11, wherein the alkyl-substituted aromatic triazole includes tolyltriazole.

13. The heat transfer composition of claim 8, wherein the coating comprises an inorganic corrosion inhibitor selected from the group consisting of water-soluble amine salts, phosphates, salts of transition elements, and combinations thereof.

14. The heat transfer composition of claim 1, wherein the coating includes at least one of the group consisting of ethylene oxide/propylene oxide block copolymers, anionic surfactants, and nonionic surfactants.

15. The heat transfer composition of claim 1, wherein the heat transfer medium is selected from the group consisting of water; aqueous brines; mixtures of water with at least one of the group consisting of alcohols, glycols, and ammonia; hydrocarbons; mineral oils; natural oils; synthetic oils; fats; waxes; ethers; esters; glycols; halogen derivatives of at least one of the group consisting of hydrocarbons, mineral oils, natural oils, synthetic oils, fats, waxes, ethers, esters, and glycols; silicate esters; biphenyl; polyaromatic compounds; salt-hydrates, organic eutectics, clathrate-hydrates; paraffins; inorganic and organic eutectic mixtures; and combinations thereof.

16. The heat transfer composition of claim 1, further including at least one additional additive selected from the group consisting of functionalizing agents, dispersants, surfactants, antioxidants, and combinations thereof.

17. A heat transfer composition for transferring heat between a heat source and a heat sink, the composition comprising:
   a heat transfer medium; and
   an additive comprising:
      a powder which includes carbon, the powder having an average particle size of from about 1 nanometer to about 100 microns, and
      a coating on the powder, the coating including at least one chemical agent selected from the group consisting of ethylene oxide/polypropylene oxide block copolymers, surfactants, lignin, lignin derivatives, alkali metal salts, alkali earth metal salts, ammonium salts, alkyl ether phosphates, and combinations thereof.

18. The heat transfer composition of claim 1, wherein the powder is formed from at least one carbon material selected from the group consisting of graphite, carbon nanotubes, diamond, and fullerene carbons of the general formula $C_{2n}$, where n is an integer of at least 30.

19. The heat transfer composition of claim 17, wherein the coating includes at least one of the group consisting of lignin and lignin derivatives.

20. An additive for a heat transfer medium comprising:
   a nano-particle size powder having an average particle size of from about 1 nanometer to about 2000 nanometers and being formed from a material selected from the group consisting of metals, alloys, metal compounds, carbon, and combinations thereof, the powder being chemically stabilized with an azole.

21. A process for transferring heat between a heat source and a heat sink, the method comprising:
   transferring heat between the heat source and the heat sink with a heat transfer composition which includes a powder having a particle size of, the powder being selected from the group consisting of metals, metal alloys, metal blends, metal compounds, carbon, and combinations thereof, the powder having an average particle size of from about 1 nanometer to about 2000 nanometers and having a surface thereof coated with a chemical agent which provides the powder with improved corrosion resistance or dispersion characteristics as compared with an uncoated powder, the chemical agent being selected from the group consisting of organic corrosion inhibitors, inorganic corrosion inhibitors, ethylene oxide/polypropylene oxide block copolymers, surfactants, lignin, lignin derivatives, and combinations thereof.

22. The process of claim 21, further including, prior to the step of transferring heat:

treating a powder with the chemical agent; and combining the treated powder with a heat transfer medium.

23. The process of claim 22, wherein the step of treating includes dispersing the chemical agent in a solvent to form a mixture; and contacting the powder with the mixture.

24. The process of claim 22, wherein the step of treating includes at least one of:

a) complexing the chemical agent with accessible surfaces of particles of the powder; and b) physically adsorbing the chemical agent on accessible surfaces of particles of the powder.

25. The process of claim 22, wherein the chemical additive is in sufficient amount to form at least a monolayer of the chemical additive on the accessible surfaces of the powder particles.

26. The process of claim 21, wherein the powder includes at least one of the group consisting of metals, metal alloys, metal blends, metal compounds and the chemical agent includes a corrosion inhibitor.

27. The process of claim 26, wherein the powder includes copper and the chemical agent includes an azole.

* * * * *